Feb. 11, 1936.  F. K. KREUTZ  2,030,215
VEHICLE WHEEL TIRE
Filed Oct. 12, 1934
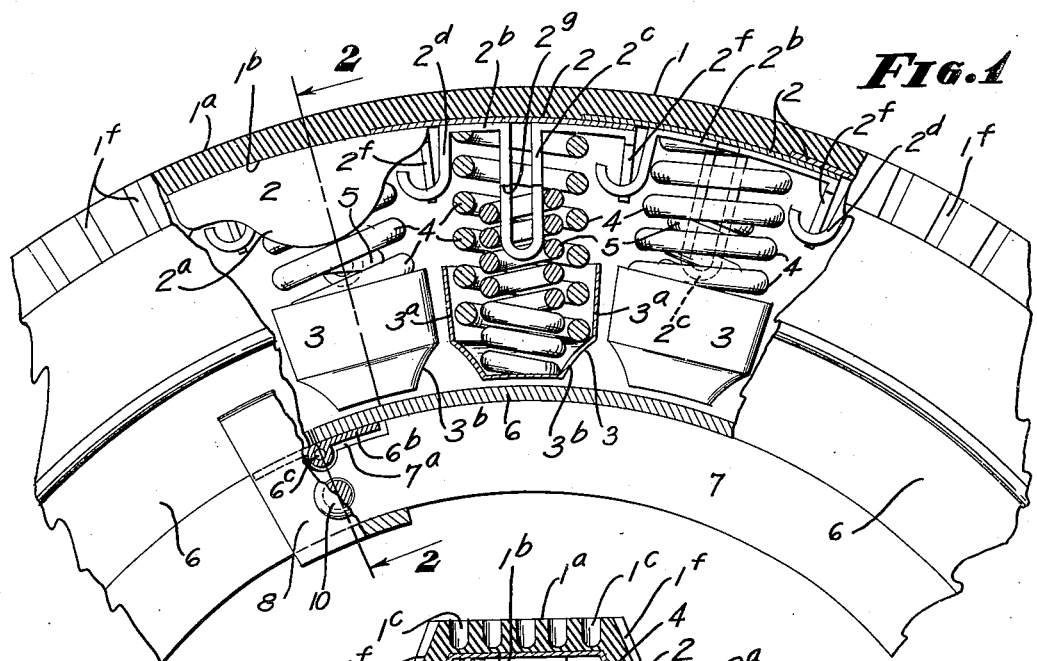
FIG. 1
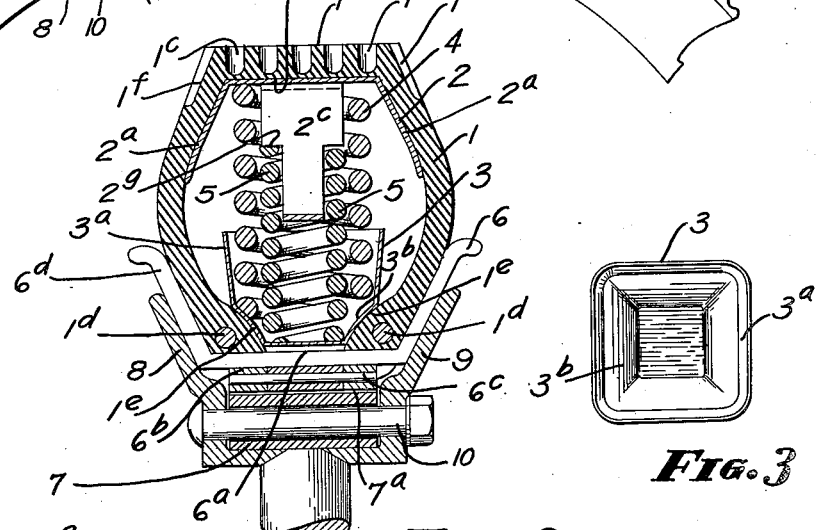
FIG. 2
FIG. 3
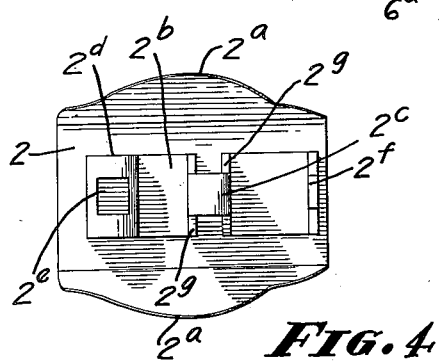
FIG. 4
INVENTOR.
Frank Krone Kreutz
BY A.B.Bowman
ATTORNEY.

Patented Feb. 11, 1936

2,030,215

UNITED STATES PATENT OFFICE 2,030,215

VEHICLE WHEEL TIRE

Frank Krone Kreutz, San Diego, Calif.

Application October 12, 1934, Serial No. 748,031

6 Claims. (Cl. 152—8)

My invention relates to vehicle wheel tires, more particularly to mechanically resilient vehicle tires, and the objects of my invention are:

First, to provide a vehicle tire in the form of a resilient casing with resilient means in connection with said casing for holding said casing in compression at all times;

Second, to provide a tire of this class in which the load is supported by means of flat pressure plates and pressure cups with compression springs interposed therebetween for holding the tire in compression at all times;

Third, to provide a tire of this class in which the pressure cups are so shaped as to support the casing rigidly against the rim;

Fourth, to provide a tire of this class in which the rim extends outwardly a considerable distance to support the side walls of the casing;

Fifth, to provide a tire of this class in which the flat pressure plates for supporting the springs against the outer walls of the casing are provided with greatly extended side walls to support and reinforce the side walls of the casing in the interior;

Sixth, to provide a tire of this class in which the compression load supporting springs are in duplicate in various sizes in each unit thus providing stability, durability and efficiency;

Seventh, to provide a tire of this class in which the flat pressure plates are interlocked and overlap one with the other; and Eighth, to provide a vehicle tire of this class which is very simple and economical of construction, durable, efficient in its action, and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application, in which:

Figure 1 is a side elevational view of a fragmentary portion of one side of my tire showing some of the parts and portions broken away and in section to facilitate the illustration; Fig. 2 is a sectional view through 2—2 of Fig. 1; Fig. 3 is a top or plan view of one of the pressure cups, and Fig. 4 is a top or plan view of one of the flat pressure plates.

Similar characters of reference refer to similar parts and portions throughout the several views of the drawing.

The resilient casing 1, flat pressure plates 2, pressure cups 3, outer springs 4, inner springs 5, tire rim 6, felly 7, clips 8 and 9, and connecting bolts 10 constitute the principal parts and portions of my vehicle wheel tire.

The resilient casing 1 is somewhat similar to the conventional combination cord, fabric and rubber tire casing now used for pneumatic tires. However, both the outer surface 1a and the inner surface 1b is relatively broad and flat, as shown best in Fig. 2 of the drawing, thus providing a relatively flat road surface at the outer side and providing a relatively flat surface to provide for a flat pressure plate 2, as shown best in Fig. 2 of the drawing, to reinforce the tire and prevent rupture. The outer flat surface is preferably provided with a plurality of relatively wide, deep main notches 1c and side notches 1f to provide efficient tread or friction surface for the tire and prevent skidding. The inner side of this casing 1 is of the conventional form and is provided with cables 1d for reinforcing the same at its inner sides and preventing its stretching. Mounted on the inner flat portion 1b and extending some distance along the side walls at the middle portion are a plurality of pressure plates 2 which are positioned in slightly overlapping relation, as shown best in Fig. 1 of the drawing, and are curved to fit the interior curved surface of the casing 1. The side walls at the center are extended at 2a, shown best in Fig. 4 of the drawing, and enough of these plates are used to cover the interior surface 1b of the casing 1. These flat pressure plates are each provided with a supporting lug 2b which is provided with a loop shaped inner spring supporting lug 2c centrally of said plate with an inwardly extending hook portion 2d at one end which is provided with a slot 2e in the curved portion and at the other end of said supporting lug 2b is a lug 2f which is adapted to fit into the slot 2e of the hook portion of the adjacent supporting lug 2b, all as shown best in Fig. 1 of the drawing.

Thus it will be seen that these plates 2 are positioned and connected in overlapped relation to each other but adapted to shift longitudinally to each other by means of the lug 2f shiftable in the slot 2e.

Mounted around the lug 2c and adapted to rest on shoulders 2g is an inner compression spring 5 which extends inwardly and is tapered at its inner end adapted to fit the converged bottom portion of the pressure cup 3, as shown best in Figs. 1 and 2 of the drawing, when in assembled relation. Thus tending to hold plate 2 and cup 3 in spaced relation. Also mounted around this spring 5 is another and stronger compression spring 4 which is of fixed length according to the depth of the tire and which engages the member 2b at its one end and engages the enlarged portion of the cup 3 at its opposite end, as shown best in Figs. 1 and 2 of the drawing, thus providing two different sized and strength springs and each unit consisting of flat pressure plate 2, supporting lug 2b, springs 4 and 5, and pressure cup 3.

This stronger spring 4 is in action after the rim 6 is assembled unfolded and locked and the lighter spring 5 will keep the pressure plates, pressure cups and spring 4 in their relation while assembling the wheel in position.

The pressure cup 3 it will be noted is provided with slightly converging walls 3a, then with reduced curved converging walls 3b which are adapted to fit between the curved portions 1e of the casing 1 and press the same against the rim 6 with the pressure of the spring 5, the bottom of said cup being slightly spaced from the flat portion 6a of the rim 6 when assembled. The rim 6 is made in sections preferably three or four sections hinged together by means of the hinges 6b and held by means of pins 6c.

It will be noted that one of these pins may be removed for collapsing the rim so that it may be folded into collapsed form.

It will also be here noted that in assembling the tire the plates 2 are positioned in interlocked relation on the interior of the casing, then the springs 4 and 5 are positioned on the plates, the spring 5 inside of the spring 4, then the cups are positioned over the ends of the springs and the foldable rim is then unfolded with the portions 6d of the rim against the outer surface of the casing at its inner beaded sides and the rim pressed and unfolded outwardly until the springs 5 are compressed sufficiently for the rim to be positioned in circular form and the loose pin inserted, the cups 3 being slightly spaced from the rim, thus providing constant pressure of the casing between the cups and the rim, after which the rim is pressed on the felly 7 and clipped by means of the clips 8 and 9 on opposite sides supported by the bolt 10.

It will also be here noted that the felly 7 is provided with recess portions 7a which are adapted to receive the hinges 6b of the rim 6, as shown best in Fig. 1 of the drawing.

Though I have shown and described a particular construction, combination and arrangement of parts and portions, I do not wish to be limited to this particular construction, combination and arrangement but desire to include in the scope of my invention the construction, combination and arrangement substantially as set forth in the appended claims.

Having thus described my invention, what I claim as new and desire to secure by Letters Patent is:

1. In a vehicle wheel tire, the combination with a casing of a plurality of substantially flat pressure plates positioned in overlapped and interlocked relation to each other and each provided centrally with a spring supporting lug with shoulders adapted to receive a spring and support it inwardly some distance from said plate, a spring supported on said shoulders on said spring supporting lug and extending inwardly therefrom in said casing, and another larger spring surrounding said first mentioned spring supported on said plate and extending inwardly therefrom in said casing around said first mentioned spring.

2. In a vehicle wheel tire, the combination with a casing of a plurality of substantially flat pressure plates positioned in overlapped and interlocked relation to each other and each provided centrally with a spring supporting lug with shoulders adapted to receive a spring and support it inwardly some distance from said plate, a spring supported on said shoulders on said spring supporting lug and extending inwardly therefrom in said casing, another larger spring surrounding said first mentioned spring supported on said plate and extending inwardly therefrom in said casing around said first mentioned spring, and a pressure cup for each plate provided with a reduced bottom portion adapted to receive and support said inner spring at its bottom and with an enlarged portion adapted to receive the extended end of said outer spring spaced from its bottom.

3. In a vehicle wheel tire, the combination with a casing of a plurality of substantially flat pressure plates positioned in overlapped and interlocked relation to each other and each provided centrally with a spring supporting lug with shoulders adapted to receive a spring and support it inwardly some distance from said plate, a spring supported on said shoulders on said spring supporting lug and extending inwardly therefrom in said casing, another larger spring surrounding said first mentioned spring supported on said plate and extending inwardly therefrom in said casing around said first mentioned spring, a pressure cup for each plate provided with a reduced bottom portion adapted to receive and support said inner spring at its bottom and with an enlarged portion adapted to receive the extended end of said outer spring spaced from its bottom, and a collapsible rim adapted to engage the bottoms of said cups when in extended position and support said cups, springs and plates in compressed relation to each other.

4. In a vehicle wheel tire, a plurality of pressure cups each substantially rectangular in cross section provided with inwardly converging walls, then with greatly inwardly converging curved walls, forming supports for two different diameter springs.

5. In a vehicle wheel tire, a plurality of pressure cups each substantially rectangular in cross section provided with a flat bottom and with inwardly converging walls, then with greatly inwardly converging curved walls, forming supports for two different diameter springs, and a foldable rim with extremely deep sides and provided with a flat middle surface conforming to the flat bottom of said cups.

6. In a device of the class described, the combination with a casing of a plurality of substantially flat pressure plates positioned in overlapped and interlocked relation to each other and provided with inwardly extending side portions extending to near the middle along the inner side of the wall of said casing and each also provided with a spring supporting lug with shoulders adapted to receive a spring and support it in spaced relation from said plate, a spring supported on said shoulder in spaced relation from said plate and extending inwardly therefrom in said casing, another larger spring surrounding said first mentioned spring supported directly on said plate and surrounding the base of said lug and extending inwardly therefrom in said casing around said first mentioned spring, a pressure cup for each plate provided with a reduced bottom portion adapted to receive and support said inner spring at its bottom and with an enlarged portion adapted to receive the extended end of said larger spring and hold it in spaced relation from the bottom of said cup, and a collapsible rim adapted to fit over the inner edge of said casing and provided with greatly extended side flanges extending to near the middle of said casing on the outer side thereof whereby said casing is reinforced at its sides to near the middle portion thereof at both its inner and outer sides.

FRANK KRONE KREUTZ.